United States Patent
Song et al.

(10) Patent No.: US 12,131,688 B2
(45) Date of Patent: Oct. 29, 2024

(54) ELECTRICAL CROSSTALK COMPENSATION FOR SCANNED LASER DISPLAY

(71) Applicant: MICROSOFT TECHNOLOGY LICENSING, LLC, Redmond, WA (US)

(72) Inventors: Shaozhen Song, Redmond, WA (US); Thomas Hamish Barter, Seattle, WA (US); Dale Eugene Zimmerman, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 18/091,340

(22) Filed: Dec. 29, 2022

(65) Prior Publication Data

US 2024/0221609 A1    Jul. 4, 2024

(51) Int. Cl.
G09G 3/32    (2016.01)

(52) U.S. Cl.
CPC .......... *G09G 3/32* (2013.01); *G09G 2310/06* (2013.01); *G09G 2310/08* (2013.01); *G09G 2320/0209* (2013.01); *G09G 2320/0693* (2013.01); *G09G 2354/00* (2013.01); *G09G 2360/16* (2013.01); *G09G 2370/04* (2013.01)

(58) Field of Classification Search
CPC ................................................ G09G 2360/18
See application file for complete search history.

(56) References Cited

U.S. PATENT DOCUMENTS

| | | |
|---|---|---|
| 11,304,289 B1 | 4/2022 | Sullivan et al. |
| 2006/0159002 A1 | 7/2006 | Kim et al. |
| 2014/0266320 A1 | 9/2014 | Conrow |
| 2018/0210086 A1 | 7/2018 | Seliuchenko et al. |
| 2019/0027109 A1* | 1/2019 | Lee .................... G09G 3/3677 |
| 2021/0258194 A1 | 8/2021 | Deog-Kyoon |
| 2021/0399764 A1 | 12/2021 | Li et al. |

OTHER PUBLICATIONS

Lusardi, et al., "Cross-Talk Issues in Time Measurements", In Journal of IEEE Access vol. 9, Sep. 15, 2021, pp. 1-17.
International Search Report and Written Opinion received for PCT Application No. PCT/US23/037043, Feb. 26, 2024, 13 pages.

* cited by examiner

*Primary Examiner* — Gustavo Polo
(74) *Attorney, Agent, or Firm* — Scott Y. Shigeta; Newport IP, LLC

(57) ABSTRACT

The techniques disclosed herein compensate for crosstalk effects between victim and aggressor emitters, such as for proximity located laser diodes in a scanned laser display system. The data stream associated with a drive signal for an aggressor is decomposed into rising and falling timing and amplitude values that are stored in a history buffer. The lag in timing between a reference timing signal from the victim data stream and the timing values in the history buffer are used to identify compensation factors. The compensation factors, which may be stored in a look-up table and based on prior collected data, are applied to rising and falling amplitudes from the history buffer to product weighted sums. The weighted sums are applied to the data stream for the victim emitter to compensate for crosstalk effects that would occur as a consequence of the aggressor.

20 Claims, 9 Drawing Sheets

ELECTRICAL CROSSTALK COMPENSATION FOR SCANNED LASER DISPLAY

BACKGROUND

Mixed Reality (MR), which may include both Augmented Reality (AR) and Virtual Reality (VR), is an industry with a rapidly expanding footprint. An MR device may be implemented with a headset that includes video and audio components to provide the immersive MR experience. An MR device may be implemented in various forms such as a near-eye-display (NED) or head mounted display (HMD) that includes left and right display components as well as left and right audio components.

In some MR devices, laser diodes may be used to generate laser beams that may be scanned across an image field to create left and right display images. The positions of the left and right images are controlled by the MR device so that, the combined images are processed by the viewer's brain in a way that results in three dimensional (3D) images with 3D depth perception. that can be perceived by the user. The beam scanning of left and right images can be accomplished by mirror-type devices such as by micro-electro-mechanical system (MEMS) devices. To achieve a full color display image, multiple laser diodes may be used, with at least one laser diode per primary color (e.g., red, blue, green). In some examples, multiple laser diodes of each color are used so that intensity or luminosity of each color may be enhanced.

MR devices provide a deeply immersive experience to the user as long as left and right images are properly aligned with minimal or no image artifacts. A disruption in alignment, either vertical or horizontal, can disrupt the user's visual system that leads to the creation of the 3D illusion, which may even result in unpleasant feelings of sickness. Additionally, the consistency of color and luminosity in a 3D image should be time aligned to eliminate formation of image artifacts or undesirable color and intensity variations with loss of definition. Thus, drive signals to the laser diodes and the MEMS devices should be sufficiently time aligned so that the desired 3D images are properly formed with minimal image quality issues.

The disclosure made herein is presented with respect to these and other considerations.

SUMMARY

The techniques disclosed herein may achieve various benefits including, but not limited to, reduced cost of manufacture and ease of product development. In some examples, the described crosstalk compensation methods may be applied to significantly improve display luminosity, color, accuracy, and image quality with reduced distortion, blur, flicker, tearing, aliasing, and other display artifacts.

Head-mounted display devices (HMD) and other near-eye display (NED) devices may be implemented in accordance with the described techniques, where such devices may be built smaller, with a higher density of components packed in smaller spaces, with more accurate laser control, and thus may achieve high-fidelity near-eye images with compact optical and electrical components. The described device and methods may be structurally simple and computationally efficient, and thus may be applied to the driving signals by adjusting the data streams, in real-time, for the display pipeline.

In some embodiments, methods are described to control pulse drive signals for pulse drivers to compensate for crosstalk effects, the methods comprising: receiving a data stream associated with a first pulse driver, detecting rising and falling edges in the received data stream, capturing timings and amplitudes of the detected rising and falling edges in a history buffer, determining compensation factors for the rising and falling edges of a second pulse driver from a look-up table based on relative timing differences of a second data stream associated with the second pulse driver and the historical timings in the history buffer for the rising and falling edges associated with the first pulse driver, and calculating rising and falling compensation currents for the second pulse driver based on the determined compensation factors and the historical amplitudes in the history buffer.

Some additional embodiments describe methods to control pulse drive signals for pulse drivers to compensate for crosstalk effects, the methods comprising: receiving a first data stream associated with a first pulse driver, receiving a second data stream associated with a second pulse driver, decomposing the rising and falling edges from the first data stream into timing and amplitude values, storing the decomposed timing and amplitude values in a history buffer, calculating rise and fall time lags for each of the rising and falling edge timing values stored in the history buffer relative to timing of the second data stream, and determining compensation currents for the rising and falling edges of the second pulse driver based on: the calculated rise and fall time lags, compensation factors associated with the calculated rise and fall time lags, and amplitude values stored in the history buffer.

In yet other embodiments, devices to adjust drive signals for pulse drivers to compensate for crosstalk effects are described, where the devices are configured by machine executable instructions to: receive a data stream associated with a first pulse driver, detect rising and falling edges in the received data stream, capture timings and amplitudes of the detected rising and falling edges in a history buffer, determine compensation factors for the rising and falling edges of a second pulse driver from a look-up table based on relative timing differences of a second data stream associated with the second pulse driver and the historical timings in the history buffer for the rising and falling edges associated with the first pulse driver, and calculate rising and falling compensation currents for the second pulse driver based on the determined compensation factors and the historical amplitudes in the history buffer.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
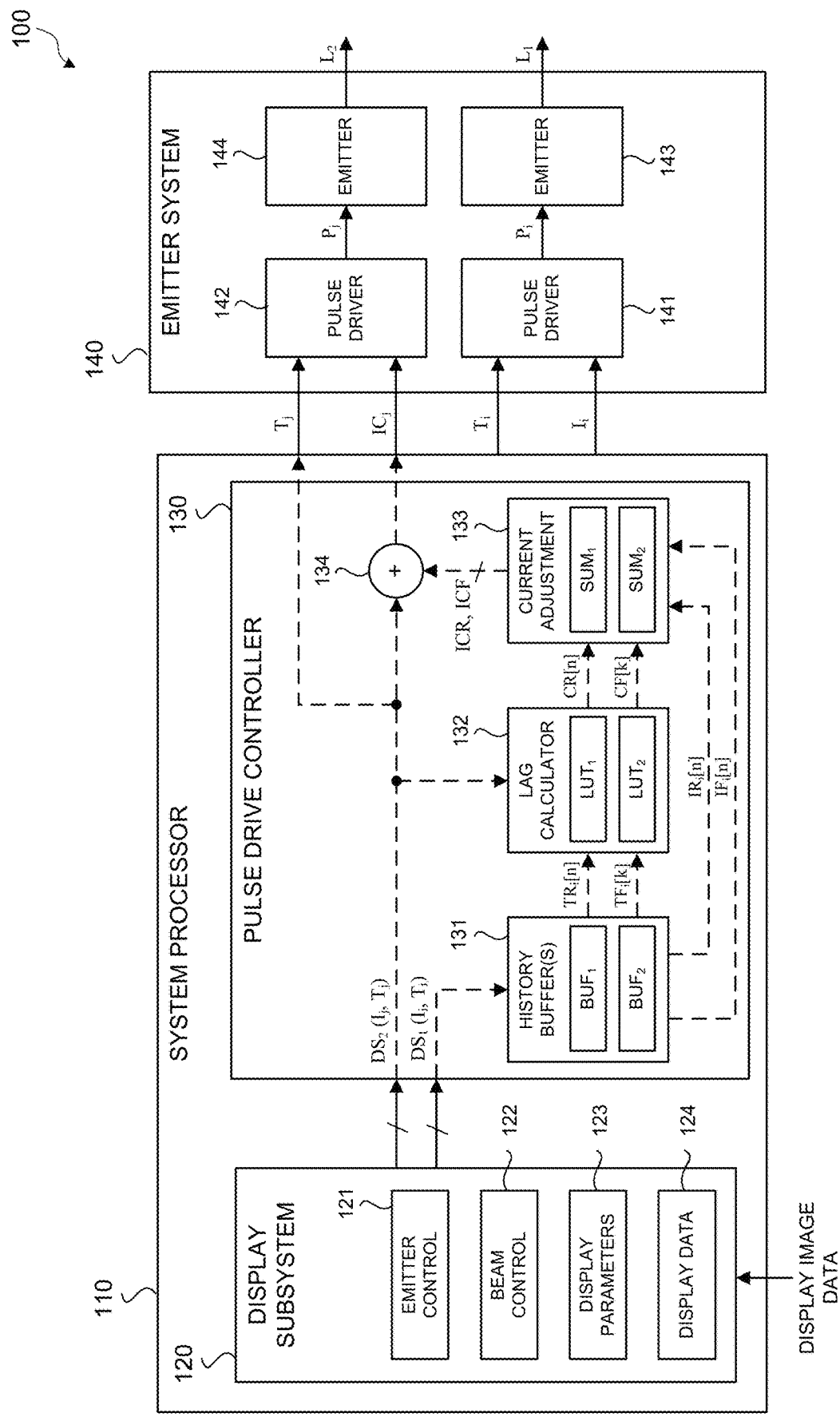
FIG. 1 schematically illustrates a system to apply crosstalk compensation.

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices and/or components. The terms "circuit" and "component" means either a single component or a multiplicity of components, either active and/or passive, that are coupled to provide a desired function. The term "signal" means at least a power, current, voltage, data, electric wave, magnetic wave, electromagnetic wave, or optical signal. Based upon context, the term "coupled" may refer to a wave or field coupling effect, which may relate to a corresponding optical field, magnetic field, electrical field, or a combined electromagnetic field.

The present disclosure contemplates novel techniques to compensate for crosstalk effects between victim and aggressor emitters, such as for laser diodes that are located in close proximity to one another in a scanning display system. The data stream associated with a drive signal for an aggressor is decomposed into rising and falling timing and amplitude values that are stored in a history buffer. The lag in timing between a reference timing signal from the victim data stream and the timing values stored in the history buffer are used to identify compensation factors. The compensation factors, which are stored in a look-up table and based on prior collected data, are applied to rising and falling amplitudes from the history buffer to product weighted sums. The weighted sums are applied to the data stream for the victim emitter to compensate for crosstalk effects that would occur as a consequence of the aggressor.

Various benefits are achieved by employing the novel techniques described herein. Some example benefits include, reduced cost of manufacture and ease of product development. In some examples, the described crosstalk compensation methods may be applied to significantly improve display luminosity, color, accuracy, and image quality with reduced distortion, blur, flicker, tearing, aliasing, and other display artifacts. Head-mounted display devices (HMD) and other near-eye display (NED) devices may also gain excellent benefits from the described techniques, since such devices can be built smaller, with a higher density of components packed in smaller spaces, more accurate laser control, and thus achieving high-fidelity near-eye images with compact optical and electrical components. are structurally simple and computationally efficient, and thus may be applied to the driving signals by adjusting the data streams, in real-time, for the display pipeline.

The disclosure made herein is presented with respect to these and other considerations.

FIG. 1 schematically illustrates a system 100 that is arranged to apply crosstalk compensation in accordance with the techniques disclosed herein. As illustrated, system 100 includes a system processor 110 and an emitter system 140. System 100 may correspond to part of a head mounted display (HMD) or other near eye display (NED) system, with additional components for beam steering and application processing (not shown).

The system processor includes a display subsystem 120 and a pulse drive controller 130. The display subsystem includes blocks for an emitter control 121, a beam control 122, display parameters 123, and display data 124. Display image data may be provided to the display subsystem 120 from other components (not shown) of the system processor, or from an external source. Operationally, the display subsystem 120 may be configured to form display images with display data 124 by selective control of emitters (e.g., laser emitters) via operation of emitter control 121, and selective control of beam scanning directions via operation of beam control 122. For example, the beam control 122 may be configured to control operation of MEMS scanning mirrors (not shown) while laser emitters are selectively activated by the emitter control 121 to result in scanning laser beam display formation. Operationally, the display subsystem is configured to provide data streams ($DS_1$, $DS_2$) and other control signals that are necessary to operate the pulse drive controller 130 and the emitter system 140 to effectively generate display images.

The pulse drive controller 130 receives two or more data streams from the display subsystem, illustrated as a first data stream ($DS_1$) and a second data stream ($DS_2$), where the data streams are associated with drive signals of emitters in the emitter system 140. In some examples, the first data stream ($DS_1$) is associated with timing ($T_i$) and current amplitude ($I_i$) values associated with drive signals for a first emitter; while the second data stream ($DS_2$) is associated with timing ($T_j$) and current amplitude ($I_j$) values associated with drive signals for a second emitter. The pulse drive controller 130 processes these data streams to adjust the second data stream ($DS_2$), which results in compensated current amplitude values ($IC_j$) for the drive signals of the second emitter.

The emitter system 140 includes functional blocks for a first pulse driver 141, a second pulse driver 142, a first emitter 143, and a second emitter 144. The first pulse driver 141 receives the timing and amplitude values ($T_i$, $I_i$) of the first data steam ($DS_1$), and responsively generates first pulse signals ($P_i$). The second pulse driver 142 receives the timing and compensated amplitude values ($T_j$, $IC_j$) of the second data steam ($DS_2$), and responsively generates second pulse signals ($P_j$). The first emitter 143 receives the first pulse signals ($P_i$), which selectively activates the first emitter 143; while the second emitter 144 receives the second pulse signals ($P_j$), which selectively activates the second emitter 144. The output of the emitters (143, 144), which may be implemented with laser diodes, may be further processed by mirrors or other optical elements (not shown) to scan, beam steer, focus, reflect, collimate, filter, or otherwise process the optical output to generate a display image.

The pulse drive controller 130 includes functional blocks for a history buffer 131, a lag calculator 132, a current adjustment calculator 133, and a summer 134. The history buffer 131, a lag calculator 132, a current adjustment calculator 133, and a summer 134. The pulse drive controller 130 receives two or more data streams from the display subsystem, illustrated as the first data stream $DS_1$ and the second data stream $DS_2$, where the data streams are associated with drive signals for the emitters in the emitter system 140. In some examples, the first data stream $DS_1$ is associated with timing ($T_i$) and current amplitude ($I_i$) values associated with drive signals for the first emitter 143; while the second data stream $DS_2$ is associated with timing ($T_j$) and current amplitude ($I_j$) values associated with drive signals for the second emitter 144. The pulse drive controller 130 processes these data streams ($DS_2$, $DS_2$) to adjust the second data stream ($DS_2$), which results in compensated values for the current amplitude ($IC_j$).

History buffer 131 is configured to store two sets of values as shown by two buffers ($BUF_1$, $BUF_2$). The first buffer $BUF_1$ is configured to store amplitude and timing values associated with rising edge transitions, while the second buffer $BUF_2$ is configured to store amplitude and timing values associated with falling edge transitions. Although shown as multiple buffers, the history buffer 131 may be implemented as a single buffer or memory storage with partitions for storing different values, or as separate buffers as illustrated.

Operationally, the values stored in the history buffer 131 may correspond to data that is extracted directly or derived from the first data stream $DS_1$, which may include values for timing ($T_i$) and current amplitude ($I_i$) associated with drive signals for an aggressor. The history buffer 131 may thus store multiple pairs of timing and amplitude values for rise and fall times detected from the first data stream $DS_1$. In one example, n-pairs of data may be stored in the first buffer $BUF_1$, where the stored data corresponds to rising edge timing and amplitude values associated with the first data stream ($DS_1$) as $TR_i[n]$ and $IR_i[n]$. In another example, k-pairs of data may be stored in the second buffer $BUF_2$, where the stored data corresponds to falling edge timing and amplitude values associated with the first data stream ($DS_1$) as $TF_i[k]$ and $IF_i[k]$.

The lag calculator 132 is illustrated as including two look-up tables ($LUT_1$, $LUT_2$). The first look-up table $LUT_1$ corresponds to a compensation coefficient look-up table for rising edge transitions, while the second look-up table $LUT_2$ corresponds to a compensation coefficient look-up table for falling edge transitions. The coefficients in the look-up tables are based on prior collected data, as will be described below. Although shown as multiple look-up tables, the look-up tables in the lag calculator 132 may be implemented as a single look-up table, or a memory storage (read-only or otherwise) with partitions for storing different values, or as tables as illustrated.

Operationally, the lag calculator 132 is configured to evaluate the second data stream (e.g., $DS_2$), which may include values for timing ($T_j$) and current amplitude ($I_j$) associated with drive signals for a victim. The lag calculator 132 is configured to identify a reference timing signal ($T_j$) for the victim data stream, and calculate a relative lag between the reference timing signal ($T_j$) and the timing values ($TR_i[n]$, $TF_i[k]$) stored in the history buffer 131. The calculated lag values are then used by the lag calculator as an index into the look-up tables (LUTs), which are accessed to identify compensation factors for the rise and fall timing adjustments. In one example, n-rising edge compensation coefficients ($CR[n]$) are identified, each being mapped to a lag value corresponding to the rising edge timing values associated with the first data stream ($DS_1$) as $TR_i[n]$ that are stored in the history buffer 131. In another example, k-falling edge compensation coefficients ($CF[k]$) are identified, each being mapped to a lag value corresponding to the falling edge timing values associated with the first data stream ($DS_2$) as $TF_i[k]$ that are stored in the history buffer 131.

The current adjustment calculator 133 is illustrated as calculating two weighted sums ($SUM_1$, $SUM_2$). The first weighted sum $SUM_1$ corresponds to calculations associated with rising edge transitions using the rising edge compensation factors ($CR[n]$), while the second weighted sum $SUM_2$ corresponds to calculations associated with falling edge transitions using the falling edge compensation factors ($CF[k]$). The resulting weighted sums from current adjustment calculator 133 correspond to current adjustment or compensation values (ICR, ICF) for the rising and falling edges associated with the victim emitter. Although shown as multiple functional blocks, the calculations made by current adjustment calculator 133 may alternatively be implemented as a single functional block.

In one example, the first weighted sum $SUM_1$ is calculated by multiplying each of the n-rising edge compensation coefficients ($CR[n]$) with a corresponding one of the n-rising edge amplitude values ($IR_i[n]$) that are stored in the history buffer 131. In another example, the second weighted sum $SUM_2$ is calculated by multiplying each of the k-falling edge compensation coefficients ($CF[k]$) with a corresponding one of the k-falling edge amplitude values ($IF_i[k]$) that are stored in the history buffer 131. Thus, current adjustment calculator 133 is configured to calculate rising and falling compensation current values (ICR, ICF) for the victim pulse driver based on the determined compensation factors ($CR[n]$, $CF[k]$) and the historical amplitudes ($IR_i[n]$, $IF_i[k]$) in the history buffer (131). In some examples, the rising compensation current (ICR) may be calculated as:

$$ICR = \sum\nolimits_{0}^{n}(IR_i[n] * CR[n]);$$

while in other examples the falling compensation current (ICF) may be calculated as:

$$ICF = \sum_{0}^{k}(IF_i[k] * CF[k]).$$

The summer 134, is illustrated as adding two compensation current values (ICR, ICF) to the second data stream $DS_2$, which is associated with the drive signal for the victim emitter. The weighted sums from the compensation current values (ICR, ICF) are thus applied to the second data stream $DS_2$ to compensate for crosstalk effects that may occur as a consequence of the aggressor. This will become further clear by the discussion that follows below.

Although illustrated as discrete functional blocks, the illustrated functional blocks for pulse drive controller 130 may be combined into fewer blocks, separated into additional blocks without departing from the spirit of the present disclosure. Additionally, the functional blocks may be implemented in hardware, software, or combinations thereof.

For various examples described above, the first data stream ($DS_1$) is associated with an aggressor, while the second data stream ($DS_2$) is associated with a victim. In this example, the aggressor's signals cause crosstalk to impact the victim's signals. However, it is understood that this is merely an example that depends on the timing and sequence of driving signals and thus the designations of first and second data streams depends on which signal is dominant as an aggressor versus victim. These designations as victim and aggressor will become more apparent from the following discussion.

As described previously, beam steering for display image formation may be accomplished by way of MEMS devices. MEMS driven Laser beam scanning is a compelling technology for lightweight head mounted displays (HMDs). The compact size, high efficiency, low divergence has made laser diodes ideal source for laser beam scanning displays. For true color displays to be achieved, at least one sets of red, green, and blue semiconductor lasers are used. In some examples, more than one emitter per primary color may be used, to achieve higher optical throughput.

Laser diodes in displays are often operated in pulsed mode because the formation of image pixels requires a high frequency modulation, which also has benefits of higher efficiency, broader emission spectrum, and improved image quality. For pulsed operation, current signals are driven into each laser diode as a short pulse to cause emission for image formation in the display. The pulse repetition rate for the current signals in pulse mode operation may be in operated the Giga-Hertz (GHz) range, and are often operated in the range of hundreds of Mega-Hertz (MHz). The high-frequency pulsed operation of laser diodes may result in unintended consequences since the fidelity and integrity of the pulse drive signals may be compromised by electrical crosstalk.

To conserve space and reduce the overall size of a HMD device, the laser emitters (e.g., laser diodes) and other electrical and optical components may be physically packed into tight spaces and in very close proximity to one another. Some non-limiting example electrical and optical components may include pulse driver circuits for the laser diodes, as well as their circuit boards or modules, couplers, and their electrical or optical transmission lines. In some HMD systems, it is preferred to collocate a set of laser diodes in the smallest possible space. In some examples, the HMD system may have one laser diode for each primary color (e.g., RGB) packed closely together. In some other examples, the HMD system may have multiple laser diodes for each primary color (e.g., RGB) packed closely together, to increase the output level of each color. Some example laser diodes may be densely packed together within micro-meter ($1 \times 10^{-6}$ m) or micron level scale density (e.g., tens to hundreds of microns between laser diodes), which also requires their related electrical interconnect (e.g., electrical conductor traces, bonding wires, transmission lines, couplers, etc.) to be in close physical proximity. In such situations where the laser diodes and their related electrical and optical components (including electrical interconnect) being packed together in small or tight physical spaces, electrical crosstalk and related signal distortion is inevitable.

Crosstalk currents can be regarded as transient disturbances between aggressor and victim signal lines, where the transient disturbances are temporally aligned with a pulse edge of the aggressor. Since laser emitters are modulated individually during a beam scan, the timing of laser pulses are asynchronous between emitters. Therefore, the temporal position of crosstalk disturbance may be dependent on the pulse timing difference.

Figure 2:
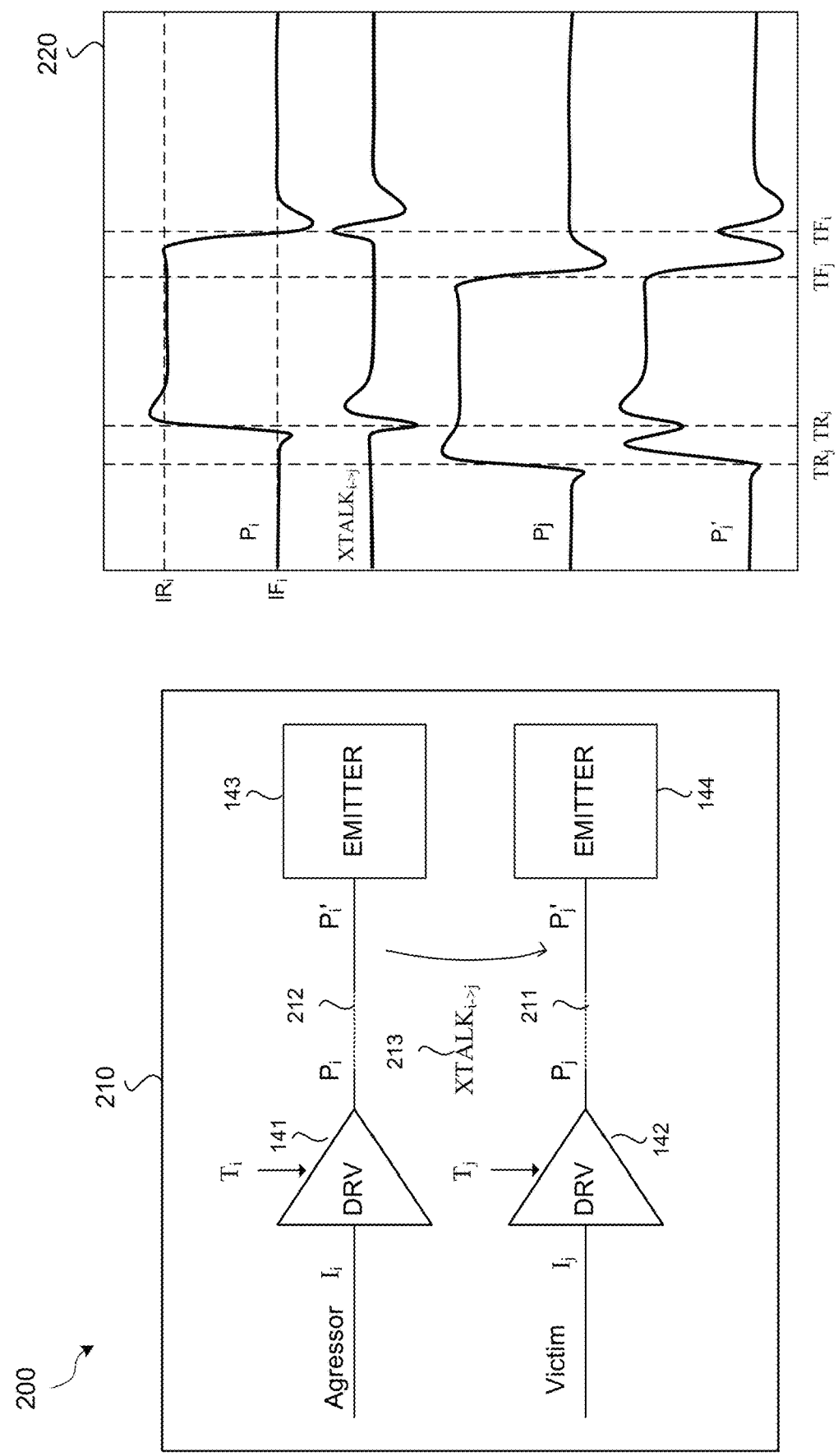
FIG. 2 schematically illustrates an example system that exhibit crosstalk prior to compensation, and a related transient response graph.

FIG. 2 schematically illustrates another example system 210 that exhibit crosstalk prior to compensation, and a related transient response graph 220.

The example system 210 as illustrated includes a first driver 141, a second driver 142, a first emitter 143 and a second emitter 144. The first driver 141, which may correspond to an aggressor, receives timing ($T_i$) and current amplitude ($I_i$) values associated with drive signals for the first emitter 143, and may responsively generates a first pulse signal ($P_i$). The second driver 142, which may correspond to a victim, receives timing ($T_j$) and current amplitude ($I_j$) values associated with drive signals for the second emitter 144, and may responsively generates a second pulse signal ($P_j$).

The first pulse signal ($P_i$) is coupled to an input of a first signal line 211; while the second pulse signal ($P_j$) is coupled an input of a second signal line 212. An output of the first signal line 211 is coupled to the first emitter 143; while an output of the second signal line 212 is coupled to the second emitter 144. Each of the first and second signal lines 211, 212 may correspond to single-ended or differential signal transmission lines, where the first and second pulse signals ($P_i$, $P_j$) that are initially transmitted at the input side of the signals lines (211, 212) may be delayed in time before arriving at the output side of the signal lines (211, 212), which is shown as the output pulse signals ($P_i'$, $P_j'$). Undesired coupling may occur between the signal transmission lines 211, 212 and other components (e.g., drivers 141/142, emitters 143/144, etc.), due to portions of the signal lines and other components being in sufficiently close proximity to one another. This undesired signal coupling is designated as signal crosstalk.

Waveforms for example signals are illustrated in graph 220, which include waveforms for the first pulse signal ($P_i$), the second pulse signal ($P_j$), signal crosstalk ($XTALK_{i->j}$) from the first pulse signal to the second pulse signal, and a resulting output signal ($P_j'$). The first pulse signal ($P_i$) has a rising edge at a first time ($TR_i$), and a falling edge at a second timing ($TF_i$), a rising edge amplitude with an upper value ($IR_i$) and a falling edge amplitude with a lower value ($IF_i$). The second pulse signal ($P_j$) has a rising edge at a first time ($TR_j$), and a falling edge at a second timing ($TF_j$), where the timing of the second pulse signal rising edge ($TR_j$) precedes the timing of the first pulse rising edge ($TR_i$) as shown.

Although the shape (e.g., the amplitudes and pulse widths) of the first and second pulse signals ($P_i$, $P_j$) are initially the same shape at the input end of the transmission lines, at the output end of the transmission lines the impact of crosstalk has created a disturbance in the waveform of the second pulse signal as shown by the distorted shape of $P_j'$. The signal crosstalk 213 in the example of FIG. 2 is labelled as $XTALK_{i->j}$, since the first pulse signal ($P_i$) corresponds to the aggressor and the second pulse signal ($P_j$) corresponds to the victim. In other examples, the designations may be reversed where the second pulse ($P_j$) may be the aggressor and the first pulse signal ($P_i$) may be the victim, which would be labelled as $XTALK_{j->i}$.

The impact of crosstalk is impacted by the physical proximity of the emitters (e.g., laser diodes and related electrical and optical components) and their non-linearity characteristics, where the light energy output on a victim is altered by the crosstalk signal (e.g., voltage, current, electromagnetic signal, etc.). The crosstalk characteristics also depend on the relative timing between the driving signals themselves (e.g., $T_i$, $T_j$). Crosstalk signals have their highest impact on emitter performance when they superpose with victim pulse edges, since the victim emitters rising and falling edges may be altered by the crosstalk disturbances, resulting in changes in the turn-on (e.g., activation) and turn-off (e.g., activation) times of the impacted emitter. The crosstalk induced timing errors may eventually leads to errors in luminance control for the display system, which may be undesirably observed as distortion or image artifacts in the displayed image (e.g., blur, flicker, tearing, aliasing, etc.).

Figure 3A:
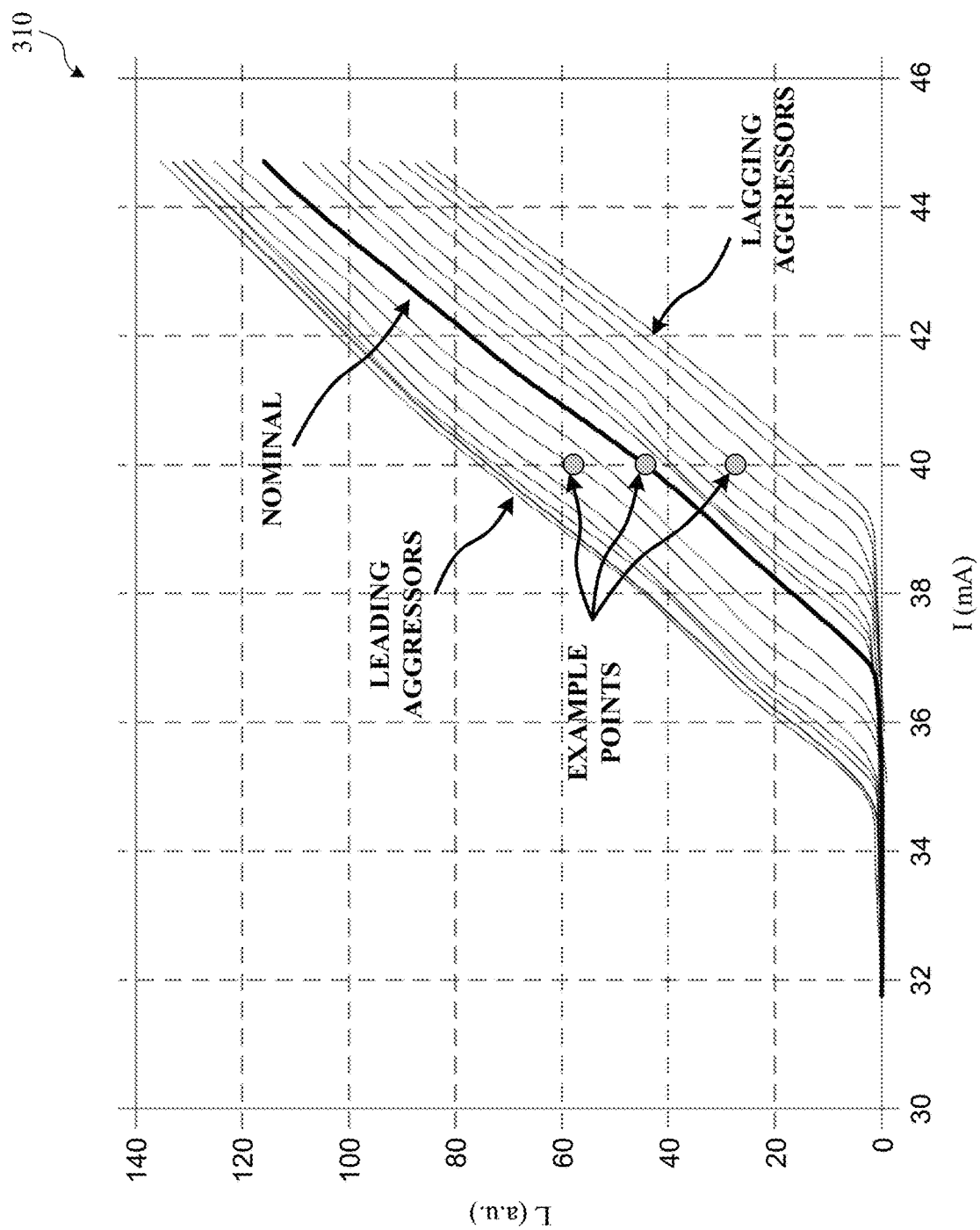
FIG. 3A illustrates a graph of an emitters luminance vs. drive current level when a victim is experiencing crosstalk disturbances.

FIG. 3A illustrates a graph of an emitters luminance (L) vs. drive current level (I) when a victim is experiencing crosstalk disturbances. For this example LI curve, the luminance (L) scale is in a range from about 0 au to about 140 au, while the drive current (I) level is in a range from about 30 mA to about 46 mA. A nominal drive current is shown with an amplitude in a range from about 37 mA to about 45 mA, with the corresponding luminance being approximately linear over a range from 0 au to about 115 au. Families of curves are also shown for timing induced differences in luminance control resulting from signal crosstalk from an aggressor. The aggressor is either time aligned with the victim pulse, or not aligned in time (either leading or lagging in time or phase).

For the nominal drive current shown on this LI curve, the aggressor pulse is aligned in time relative to the victim pulse. On one side of the nominal case of the LI curve, the aggressor pulse is leading in time (or leading in phase) relative to the victim pulse; while on the other side of the nominal case of the LI curve the aggressor pulse is lagging in time (or lagging in phase) relative to the victim pulse. In one example, a leading aggressor pulse impact on the victim pulse may result in a drive current with an amplitude in a range of about 35 mA to about 45 mA, with the corresponding luminance being approximately linear over a range from 0 au to about 130 au. In another example, a lagging aggressor pulse impact on the victim pulse may result in a drive current with an amplitude in a range of about 39 mA to about 45 mA, with the corresponding luminance being approximately linear over a range from 0 au to about 90 au.

For a selected drive current level on a victim pulse, a point is selected on the nominal curve and the related timing induced variations from the aggressor pulse are found on the adjacent curves for leading and lagging aggressors. Example points for a selected drive current of 40 mA is shown on FIG. 3A. For the example points, the drive current of 40 mA has a nominal value of the total luminosity of about 45 au, while a leading aggressor's crosstalk induced change may result in a total luminosity of about 58 au, and a lagging aggressor's crosstalk induced change may result in a total luminosity of about 26 au.

As observed. the effect of crosstalk on a laser diode type of emitter can be approximated as the effective lasing threshold shift. In a laser based display system (LBS), where threshold shifts exhibit large luminosity errors at low light levels. A prominent pathological display scenario is when a display is showing a plain field or a low frequency image (e.g., an image that is not changing rapidly from frame to frame). In this scenario, the amount of luminosity error in the display image follows the spatial modulation pattern of the two emitters, thus a periodic artifact pattern may be observed.

One strategy to mitigate signal crosstalk is to physically eliminate electrical cross-coupling in the laser emitters and the related driving circuits at the component level. However, this strategy may require significant root-cause analysis in all of the crosstalk of all of the laser and driver components, resulting in significant cost and effort to re-design individual components for the purpose of crosstalk mitigation. Moreover, the physical devices are practicality limited by component dimensional requirements and physical layout restrictions.

The present disclosure recognizes a more efficient and practical solution to crosstalk mitigation by introducing a counter crosstalk mechanism in the emitter control algorithm or process (which may be implemented in hardware, software, or combinations thereof). Luminance control of the pulsed emitters may be improved according to the present techniques by applying compensation to make corrections to victim laser pulse amplitudes to cancel out and/or mitigate the impact on crosstalk disturbances. The compensation techniques are structurally simple and computationally efficient, and thus may be applied to the driving signals by adjusting the data streams, in real-time, for the display pipeline.

The following approximations are contemplated in modelling the signal crosstalk impact in the disclosed compensation techniques, which result in a cost effective, computationally efficient, real-time, and practical solution. To reduce complexity (1) the crosstalk-affected LI curve is modeled as translational shift of the nominal LI curve in the drive current (or drive signal) domain. The amount of shift in this domain can be represented as a function of the aggressor time lag (e.g., the difference in timing between the aggressor and victim drive signals), and linearly scalable with aggressor amplitude. (2) The effect of crosstalk on a victim from a sequence of aggressor edges can be linearly superposed over one another. (3) The amounts of compensation current that can be applied to the victim is negligible when considering the reverse-direction crosstalk (e.g., victim's effect on aggressor).

Figure 4:
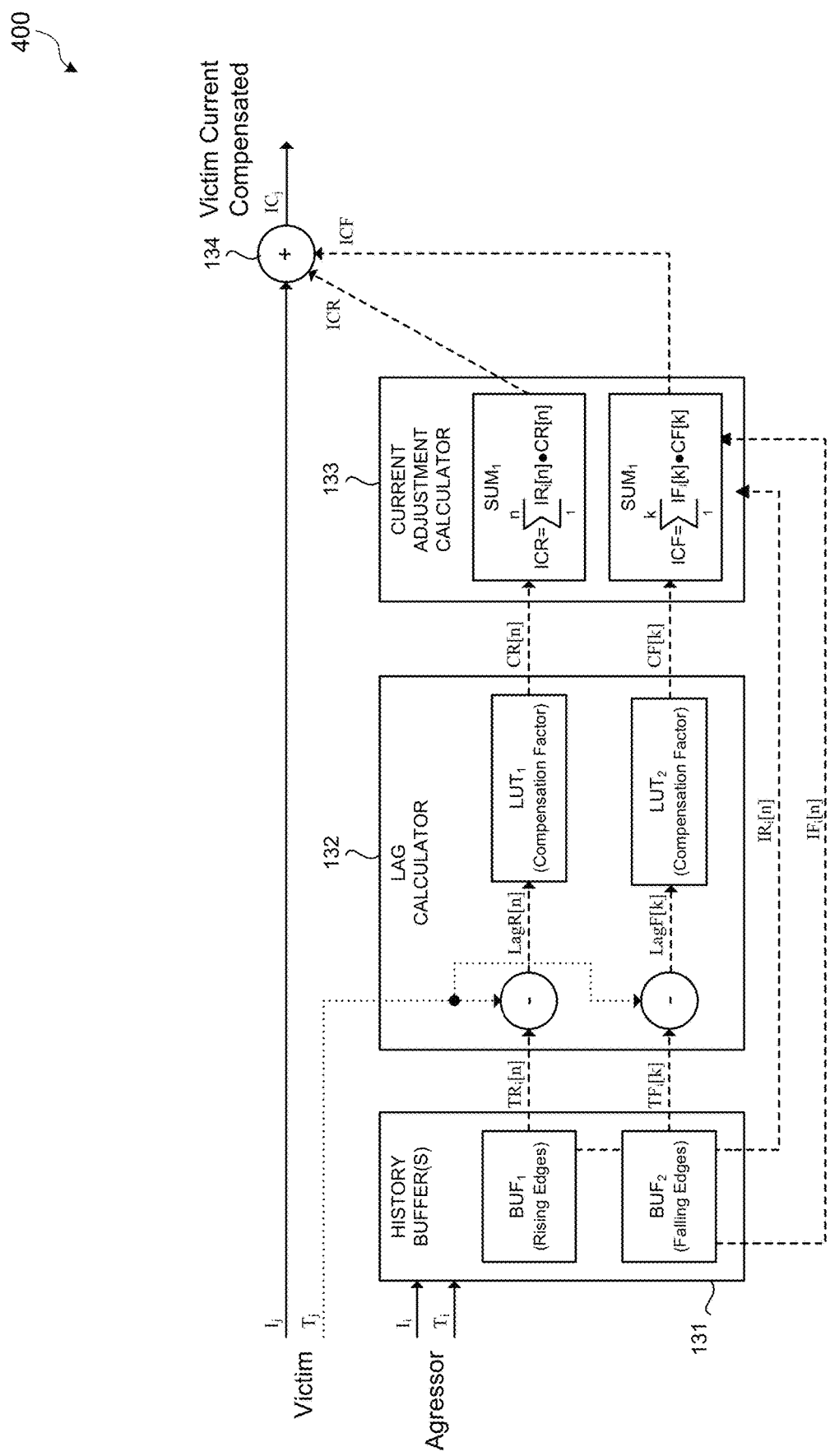
FIG. 4 schematically illustrates an example pulse drive controller device that is configured to apply crosstalk compensation.

FIG. 4 schematically illustrates an example pulse controller device 400 that is configured to apply crosstalk compensation in accordance with the techniques disclosed herein. As illustrated, pulse controller device 400 includes functional blocks for a history buffer 131, a lag calculator 132, a current adjustment calculator 133, and a summer 134. Like components from FIG. 1 are labelled identically in FIG. 4.

Two or more data streams from the display subsystem (not shown in FIG. 4) are illustrated as the first data stream $DS_1$ and the second data stream $DS_2$, where the data streams are associated with drive signals for the emitters (also not shown in FIG. 4). The first data stream $DS_1$ is associated with timing ($T_i$) and current amplitude ($I_i$) values associated with drive signals for the first emitter 143; while the second data stream $DS_2$ is associated with timing ($T_j$) and current amplitude ($I_j$) values associated with drive signals for the second emitter 144. The pulse drive controller device 130 is configured to process these data streams ($DS_2$, $DS_2$) to adjust the second data stream ($DS_2$), which results in compensated values for the current amplitude ($IC_j$).

Considering a pair of crosstalk emitters (not shown), the described process takes their current amplitude and timing of laser pulses as input, and calculate compensation current accordingly, with the following steps.

Step (1): based on the aggressor pulse amplitude and timing (e.g., $I_i$, $T_i$), each pulse waveform represented in the first data stream ($DS_1$), including its porch (sometimes referred to as "threshold current"), is de-composed into rising and falling edges, where the amplitude and timing values for the rising and falling edges (e.g., $IR_i$, $TR_i$; and $IF_i$, $TF_i$) are stored in a buffer (e.g., a history buffer 131). Since victim pulses are predominately affected by adjacent laser pulses, the depth of the buffer (131) may correspond to a number (e.g., N) of clock cycles. For example, the depth of the buffer may correspond to 1 clock cycle, 2 clock cycles, 3 clock cycles, 4 clock cycles, 5 clock cycles, etc. Generally speaking, the depth of the buffer may nominally be considered as about 3 clock cycles, or in a range of about 1 clock cycle to about 5 clock cycles. However, the disclosure is not so limited, and the specific number of clock cycles required for the buffer depth may be determined based on the speed and pulse width of the clock signals relative to the speed and pulse width of the pulse drive signals as implemented in the particular example system.

Step (2): for each aggressor edge ($TR_i[n]$, $TF_i[k]$) within the requisite number (e.g., N) of clock cycles, the lag calculator 132 calculates the time lag (e.g., LagR[n], LagF[k]) of each aggressor edge (e.g., rising or falling edge) relative to the victim pulse. Since the buffer depth (e.g., N) corresponds to the requisite number of clock cycles, the clocks cycles and buffer depth also correspond to a bracketed time window about the relative timing ($T_j$) of the victim pulse. For example, the time lags may be calculated for rising edges as: LagR[n]= $T_j$-TR[n]; while the time lags may be calculated for falling edges as: LagF[k]=$T_j$-TF[k]; where the values of n and k correspond to indices to the buffer 131 that are within the bracketed time window of the victim pulse.

Step (3): for each calculated time lag (e.g., LagR[n], LagF[k]) of each aggressor edge (e.g., rising or falling edge), the lag calculator 132 determines the compensation factor C for each edge (e.g., rising or falling edge) using a pre-calibrated look-up table. As previously discussed, the lag calculator 132 may be implemented with two look-up tables ($LUT_1$, $LUT_2$), where one look-up table may be for rising edge compensation factors (e.g., CR[n]) and one look-up table may be for falling edge compensation factors (e.g., CF[k]). The compensation factors (CR[n], CF[k]) correspond to coefficients in the look-up tables that are based on prior collected or pre-calibrated data that is indexed by time lag.

Step (4): the current adjustment calculator 133 applies each determined compensation factor (e.g., CR[n], CF[k]) to a corresponding aggressor edge amplitude ($IR_i[n]$, $IF_i[k]$) to generate a compensation current value for the corresponding edge (rising or falling). The scaled amplitude values correspond to the amount of compensation current that is required to achieve the intended luminosity in the victim pulse. The current adjustment calculator 133 sums all of the individual compensation currents for all aggressor edges and applies the compensation to the victim current with the summer 134. In some examples, the rising compensation current (ICR) may be calculated as:

$$ICR = \sum_0^n (IR_i[n] * CR[n]);$$

while in other examples the falling compensation current (ICF) may be calculated as:

$$ICF = \sum_0^k (IF_i[k] * CF[k]).$$

For calibration, compensation factors in the lookup table (or tables) can be obtained by sweeping an aggressor edge (e.g., rising or falling edge) across a victim pulse, recording the victim pulse luminosity, calculating the difference between the desired luminosity and the recorded luminosity, and determining the required change in the driving current for the victim pulse necessary to achieve the desired luminosity. The driving current level for the emitter will depend on the drive characteristics of the emitter (e.g., the nominal LI curve of the laser diode). Thus, the compensation factor at each aggressor lag can be calculated as the amount of driving current change that is required to achieve the equivalent nominal luminosity, given a unit amount of aggressor amplitude. In some examples, the compensation factors may be determined on class basis, where a representative set of laser diodes are tested to determine the set of compensation factors for the class of laser diodes. In some other examples, different compensation factors may be determined for each of the specific laser diodes used in the system. For class based compensation, the class may correspond to the type of laser diode, the color of the laser diode, and/or the specific arrangement of laser diodes. Thus, different lookup tables may be generated for each class or each individual laser diode based emitter.

The sweep of aggressor edges used in calibration will be done for varied aggressor timings and over a family of varied aggressor drive current amplitudes. A total sweep time for the aggressor edges is dependent on the pulse drive characteristics of the emitters in the system (e.g., pulse rate, rise/fall times, repetition rate, clock rate, pulse width, etc.). An example victim may generate a pulse with a rise time initiated at time X1 and a fall time initiated at time X2 with a total pulse width of Y. For this example, the start time of the aggressor rising edge may be swept from time X1-Y to time X2+Y to ensure that all possible impacts of the aggressor pulse on the victim pulse are captured in the sweep.

In some examples the total sweep time may be expressed as a number of pulse widths of the victim pulse (e.g., total sweep time for the aggressor pulse is in a range from about 1*Y to about 5*Y); while in other examples the total sweep time may be expressed as a number of clocks (N) of the system that control the pulses (e.g., total sweep time for the aggressor pulse is in a range from about 1*N to about 5*N). The step time or incremental time used in the sweep should also be adjusted to capture the correct level of granularity needed for compensation adjustments. In some examples the step time may be expressed as a fraction (z) of the total pulse width Y (e.g., Y/z, where z=an integer from 2 to 100); while in other examples the step time may be expressed as a fraction (z) of the number of clocks (N) of the system that control the pulses (e.g., N/z, where z=an integer from 2 to 100). For various examples contemplated herein, the clock rate of the system may be on the order of nano-seconds ($1 \times 10^{-9}$ s), while the step rate may be on the order of 100 pS ($100 \times 10^{-12}$ s).

Some example laser diode emitters may be operated with a pulse width in a range of about 10 pS to about 1 nS, with a pulse repetition rate in a range of about 33 GHz to about 300 MHz. Other example laser diode emitters may be operated with a pulse width in a range of about 1 nS to about 100 nS with a pulse repetition rate in a range of about 300 MHz to about 3 Mhz. Still other example laser diode emitters may be operated with a pulse width in a range of about 100 pS to about 10 nS and a pulse repetition rate in a range of about 3 GHz to about 30 Mhz. Yet other example laser diode emitters may be operated with a pulse width in a range of about 10 nS to about 1 uS, and a pulse repetition rate in a range of about 30 MHz to about 1 Mhz. Other example laser diode emitters are considered, with different ranges of pulse widths and repetition rates.

Figure 3B:
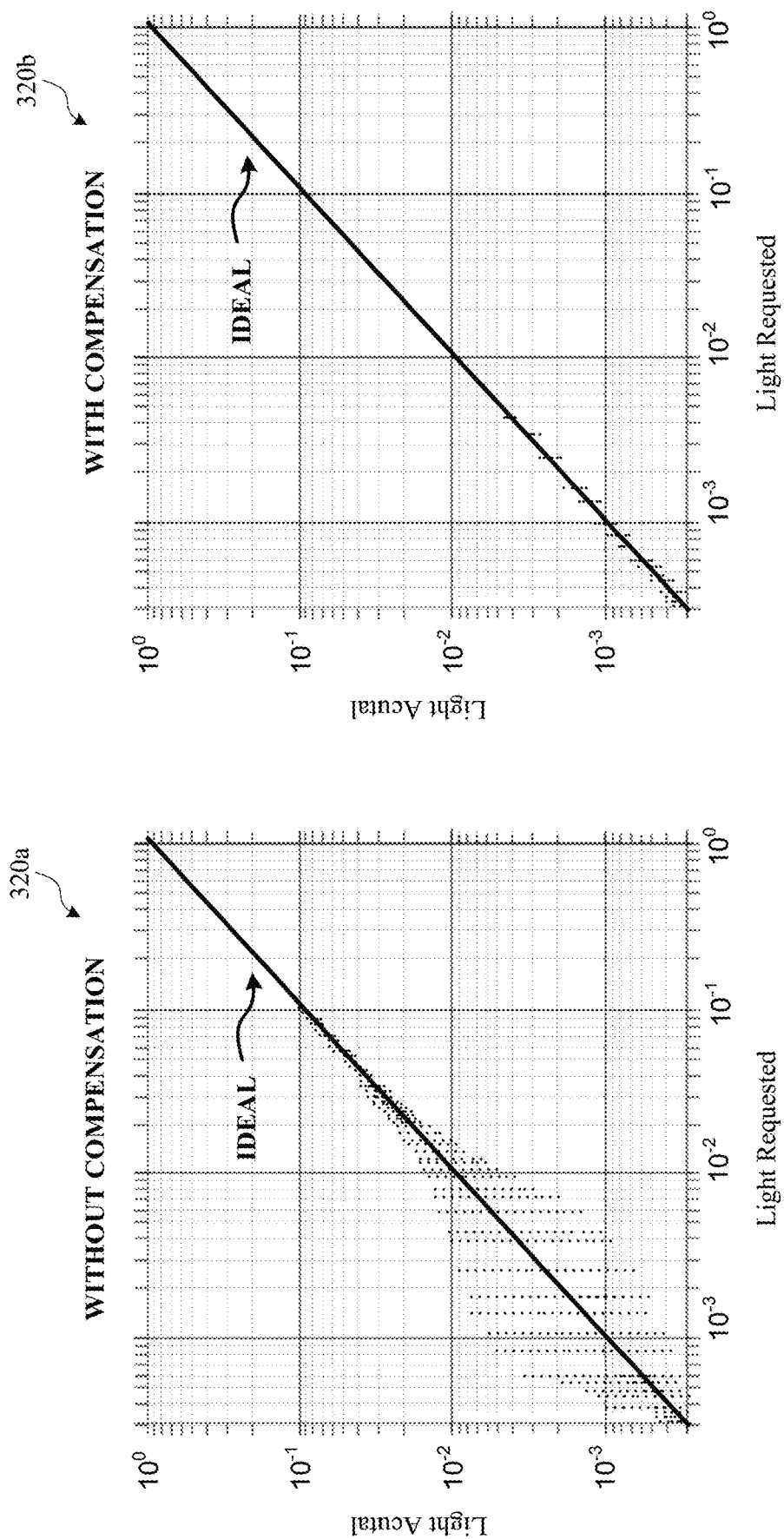
FIG. 3B illustrates graphs of luminosity accuracy both before and after crosstalk compensation.

As a validation experiment, two groups of LI data have been evaluated both with and without application of crosstalk compensation to a victim laser diode emitter. FIG. 3B illustrates graphs of luminosity accuracy both before (320a) and after (320b) crosstalk compensation. The LI data was acquired with a variable aggressor lag, where lag is expressed in the form of phase lag over a range of clock cycles. In this example, 2× represents one clock cycle, and the aggressor phase lag is varied from a range of −4π to +2π (e.g., from −2 clock cycles to +1 clock cycle) with a range of 6π (e.g., 3 clock cycles). The aggressor has a low amplitude rising edge of 20 mA. The LI data was presented in the format of actual light output vs. requested light, in order to visualize the relative accuracy of luminosity control.

As shown by graph 320a, the actual light output (Light Actual) ideally matches the requested light output (Light Requested), as shown by the IDEAL line. However, without compensation, the actual light output has maximum deviation from the requested light that is approximately 1/1000 (or $1 \times 10^{-3}$) the maximum light output, but luminosity accuracy seems to improve as the requested light output increases to higher values. As shown by graph 320b, with crosstalk compensation, actual light output (Light Actual) complies with requested light output (Light Requested) well at full dynamic range.

Figure 5:
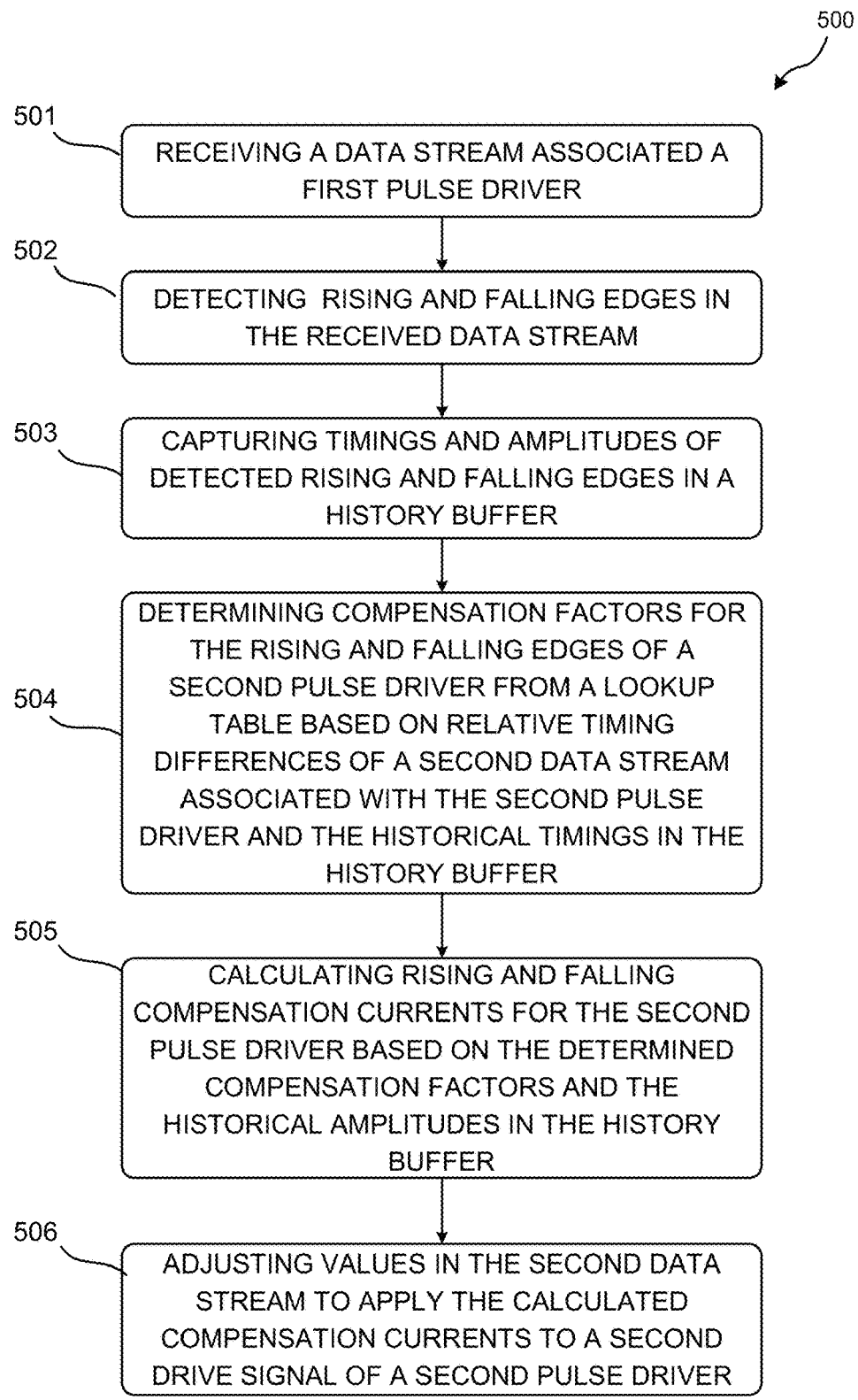
FIG. 5 is a flow chart illustrating an example process of crosstalk compensation for a pulse drive controller device or system.

FIG. 5 is a flow chart illustrating an example process 500 of crosstalk compensation for a pulse drive controller device or system. The described processes and methods may be implemented as a portion of a portable electronic device such as a laptop computer, a body worn device such as a VR headset or head mounted display (HMD) device, or another portable electronic device. Processing for various described processes and methods may commence at block 501.

At block 501, a data stream associated with a first pulse driver may be received by the pulse drive controller device or system (100, 400). The first data stream (e.g., $DS_1$) may include data elements associated with both a drive current level ($I_i$) and a timing ($T_i$) associated with the first pulse driver (141). Thus, in some examples, the first data stream ($DS_1$) may include a first current data stream ($I_i$) associated with drive currents of the first pulse driver (141); and also include a first timing data stream ($T_i$) associated with the timing of drive currents of the first pulse driver (141). An example method employed by the pulse drive controller device or system (100, 400) at block 501 may include receiving a data stream associated a first pulse driver (141). Block 501 may be followed by block 502.

At block 502, rising and falling edges in the received data stream are detected. The data stream includes amplitude and timing values associated with the drive signal for the first pulse driver (141). The rising and falling edges in the first data stream ($DS_1$) may be identified and decomposed into rising edge amplitude and timing values (e.g., $IR_i$, $TR_i$) and falling edge amplitude and timing values (e.g., $TF_i$, $IF_i$). An example method employed by the pulse drive controller device or system (100, 400) at block 502 may include detecting rising and falling edges in the received data stream. Block 502 may be followed by block 503.

At block 503, the timing and amplitudes of the rising and falling edges detected in the first data stream ($DS_1$) are captured, (e.g., in a history buffer 131). For example, the amplitude and timing values of the rising edge (e.g., $IR_i$, $TR_i$) and amplitude and timing values of the falling edge (e.g., $TF_i$, $IF_i$). In some examples, capturing the timings ($TR_i$, $TF_i$) and amplitudes ($IR_i$, $IF_i$) of the detected rising and falling edges in the history buffer (131) may further comprises updating the history buffer (131) to contain the most recent N captures. An example method employed by the pulse drive controller device or system (100, 400) at block 504 may include capturing timings and amplitudes of detected rising and falling edges in a history buffer (131). Block 503 may be followed by block 504.

At block 504, compensation factor associated with the rising and falling edges of a second pulse driver may be determined such as by the lag calculator (132). A relative time difference (or time lag) between the timing of the first pulse signal (e.g., $T_i$) and the timing of the second pulse signal (e.g., $T_j$) may be determined. Based on the relative timing difference (or Lag) a compensation factor (e.g., C) may be determined. For example, compensation factors (CR[n], CF[k]) for the rising and falling edges of a second pulse driver (142) may be determined from a look-up table based on the relative timing differences between the first data stream ($DS_1$) and the second data stream ($DS_2$). In various examples, a reference time ($T_j$) associated with the second data stream ($DS_2$) may be determined, and a time difference (LagR[n], LagF[k]) between the references time ($T_j$) and each rising and falling edge time in the history buffer (131) that is within a bracketed time window of the reference time ($T_j$) may be determined. Look-up tables with the calculated time differences (LagR[n], LagF[k]) may be accessed to identify the corresponding compensation factors (CR[n], CF[k]). The bracketed time window may be within a range of about 1 clock cycle to about 5 clock cycles relative to the drive signals, and the depth N of the history buffer (131) may be determined by the bracketed time window. An example method employed by the pulse drive controller device or system (100, 400) at block 504 may include determining compensation factors for the rising and falling edges of a second pulse driver from a lookup table based on relative timing differences of a second data stream associated with the second pulse driver and the historical timings in the history buffer (131). Block 504 may be followed by block 505.

At block 505, rising and falling compensation currents may be calculated (e.g., by the current adjustment calculator 133) for the second pulse driver (e.g., 142) based on the determined compensation factors and current amplitudes. The rising and falling compensation currents (ICR, ICF) for the second pulse driver (142) may be based on the determined compensation factors (CR[n], CF[k]) and the historical amplitudes (IR$_i$[n], IF$_i$[k]) in the history buffer (131). For example, a rising compensation current (ICR) may be calculated as:

$$ICR = \sum_{0}^{n}(IR_i[n] * CR[n]);$$

and a falling compensation current (ICF) may be calculated as:

$$ICF = \sum_{0}^{k}(IF_i[k] * CF[k]).$$

An example method employed by the pulse drive controller device or system (100, 400) at block 505 may include calculating rising and falling compensation currents for the second pulse driver based on the determined compensation factors and the historical amplitudes in the history buffer (131). Block 505 may be followed by block 506.

At block 506, values in the second data stream may be adjusted so that the compensation currents may be applied to a second drive signal of a second pulse driver. In various examples, values in the second data stream (DS$_2$) may be adjusted (e.g., by summer 134) to apply the calculated compensation currents (ICR, ICF) to the second driver signal in the second data stream (DS$_2$) for the second pulse driver (142). An example method employed by the pulse drive controller device or system (100, 400) at block 506 may include adjusting values in the second data stream (DS$_2$) to apply the calculated compensation currents (e.g., ICR, ICF) to a second drive signal of a second pulse driver (e.g., 142).

Figure 6:
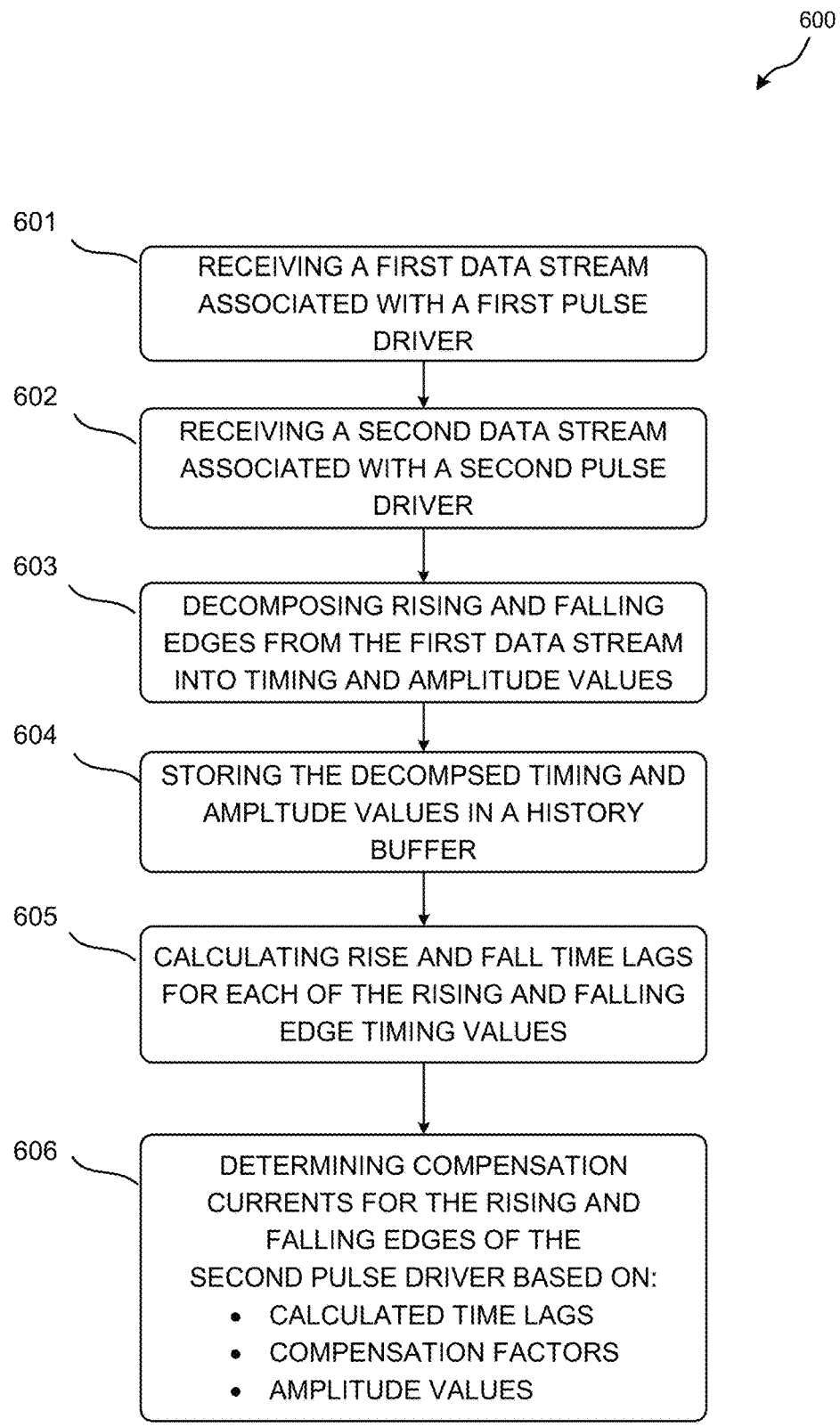
FIG. 6 is a flow chart illustrating another example process of crosstalk compensation for a pulse drive controller device or system.

FIG. 6 is a flow chart illustrating another example process 600 of crosstalk compensation for a pulse drive controller device or system. The described processes and methods may be implemented as a portion of a portable electronic device such as a laptop computer, a body worn device such as a VR headset or head mounted display (HMD) device, or another portable electronic device. Processing for various described processes and methods may commence at block 601.

At block 601, a first data stream associated with a first pulse driver may be received by the pulse drive controller device or system (100, 400). The first data stream (e.g., DS$_1$) may include data elements associated with both a drive current level (I$_i$) and a timing (T$_i$) associated with the first pulse driver (141). Thus, in some examples, the first data stream (DS$_1$) may include a first current data stream (I$_i$) associated with drive currents of the first pulse driver (141); and also include a first timing data stream (T$_i$) associated with the timing of drive currents of the first pulse driver (141). An example method employed by the pulse drive controller device or system (100, 400) at block 601 may include receiving a first data stream associated a first pulse driver (141). Block 601 may be followed by block 602.

At block 602, a second data stream associated with a second pulse driver may be received by the pulse drive controller device or system (100, 400). The second data stream (e.g., DS$_2$) may include data elements associated with both a drive current level (I$_j$) and a timing (T$_j$) associated with the second pulse driver (142). Thus, in some examples, the second data stream (DS$_2$) may include a second current data stream (I$_j$) associated with drive currents of the second pulse driver (142); and also include a second timing data stream (T$_j$) associated with the timing of drive currents of the second pulse driver (142). An example method employed by the pulse drive controller device or system (100, 400) at block 602 may include receiving a second data stream associated a second pulse driver (142). Block 602 may be followed by block 603.

At block 603, rising and falling edges in the received first data stream are decomposed. The data stream includes amplitude and timing values associated with the drive signal for the first pulse driver (141). The rising and falling edges in the first data stream (DS$_1$) may be identified and decomposed into rising edge amplitude and timing values (e.g., IR$_i$, TR$_i$) and falling edge amplitude and timing values (e.g., TF$_i$, IF$_i$). An example method employed by the pulse drive controller device or system (100, 400) at block 603 may include decomposing rising and falling edges from the first data stream into timing and amplitude values. Block 603 may be followed by block 604.

At block 604, the timing and amplitudes of the rising and falling edges decomposed from the first data stream (DS1) are stored (e.g., in a history buffer 131). For example, the amplitude and timing values of the rising edge (e.g., IR$_i$, TR$_i$) and amplitude and timing values of the falling edge (e.g., TF$_i$, IF$_i$) may be extracted from the first data stream (DS$_1$). In some examples, timing and amplitude values for each rising edge of each identified pulse may be stored in a rising edge history buffer (BUF$_1$), and each timing and amplitude values for each falling edge of each identified pulse may be stored in a falling edge history buffer (BUF$_2$). An example method employed by the pulse drive controller device or system (100, 400) at block 604 may include storing the decomposed timing and amplitude values in a history buffer (131). Block 604 may be followed by block 605.

At block 605, lag values for each of the rising and falling edge times may be calculated relative to a reference time (e.g., by lag calculator 132). In some examples, rise and fall time lags may be calculated by: calculating a first reference time value for a rising edge of the second data stream; calculating a second reference time value for a falling edge of the second data stream; for each of the timing values in the rising edge history buffer, calculating a corresponding first difference with the first reference time; and for each of the timing values in the falling edge history buffer, calculating a corresponding second difference with the second reference time. An example method employed by the pulse drive controller device or system (100, 400) at block 605 may include calculating rise and fall time lags for each of the rising and falling edge timing values. Block 605 may be followed by block 606.

At block 606, compensation currents for the rising and falling edges of the second pulse driver may be calculated (e.g., by the current adjustment calculator 133). The rising and falling compensation currents (ICR, ICF) for the second pulse driver (142) may be based on the determined compensation factors (CR[n], CF[k]) and the historical amplitudes (IR$_i$[n], IF$_i$[k]) in the history buffer (131), and the calculate time lags (LagR[n], LagF[k]). In some examples, compensation currents for the rising edges of the second pulsed driver may be determined by: retrieving each amplitude value (IR$_i$[n]) associated with each rising edge of the rising edge history buffer (131); identifying each first compensation factor (CR[n]) for each rising edge based on the corresponding first difference; and summing the multiplications of each amplitude value (IR$_i$[n]) by the corresponding first compensation factor (CR[n]) to yield a rising compensation current value (ICR) given by:

$$ICR = \sum_{0}^{n}(IR_r[n] * CR[n]).$$

In some other examples, compensation currents for the falling edges of the second pulsed driver may be determined by: retrieving each amplitude value (IF$_r$[k]) associated with each falling edge of the falling edge history buffer; identifying each second compensation factor (CF[k]) for each falling edge based on the corresponding second difference; and summing the multiplications of each amplitude value (IF$_r$[k]) by the corresponding second compensation factor (CF[k]) to yield a falling compensation current value (ICF) given by:

$$ICF = \sum_{0}^{k}(IF_i[k] * CF[k]).$$

An example method employed by the pulse drive controller device or system (100, 400) at block 606 may include determining compensation currents for the rising and falling edges of the second pulse driver based on: calculated time lags, compensation factors, and amplitude values.

Additional methods may be further employed to identify the first compensation factor (CR[n]) for each rising edge corresponds to accessing a pre-calibrated lookup-table associated with rising edges; and identify the second compensation factor (CR[k]) for each falling edge corresponds to accessing a pre-calibrated lookup-table associated with falling edges.

Further methods may be used to obtain the pre-calibrated lookup-table associated with rising edges by capturing luminosity values for a victim pulse while sweeping a rising edge associated with an aggressor pulse across a first range of values, and wherein the pre-calibrated lookup-table associated with falling edges is obtained by capturing luminosity values for a victim pulse while sweeping a falling edge associated with the aggressor pulse across a second range of values.

FIG. 14 shows the display device in the form of a head-mounted display (HMD) device. The head-mounted display may be a near-eye display ("NED") device 700 that includes a mirror control system 702 implementing aspects of the technologies disclosed herein. The mirror control system 702 includes the laser beam emitter system 140, mirrors 720 and 730, and controllers 703. Some similar components were described in detail above with regard to FIGS. 1-6.

In some examples, the NED device 700 may utilize the mirror control system 702 to generate a composite view (e.g., from a perspective of a user that is wearing the NED device 1400) that includes both one or more computer-generated ("CG") images and a view of at least a portion of a real-world environment surrounding the NED device 700. For example, the mirror control system 702 may utilize various technologies such as, for example, augmented reality ("AR") technologies to generate composite views that include CG images superimposed over a real-world view. As such, the mirror control system 702 may be configured to generate CG images via a display panel 704.

In the illustrated example, the display panel 704 includes separate right eye and left eye transparent display panels, labeled 704R and 704L, respectively. In some examples, the display panel 704 may include a single transparent display panel that is viewable with both eyes and/or a single transparent display panel that is viewable by a single eye only.

Figure 7:
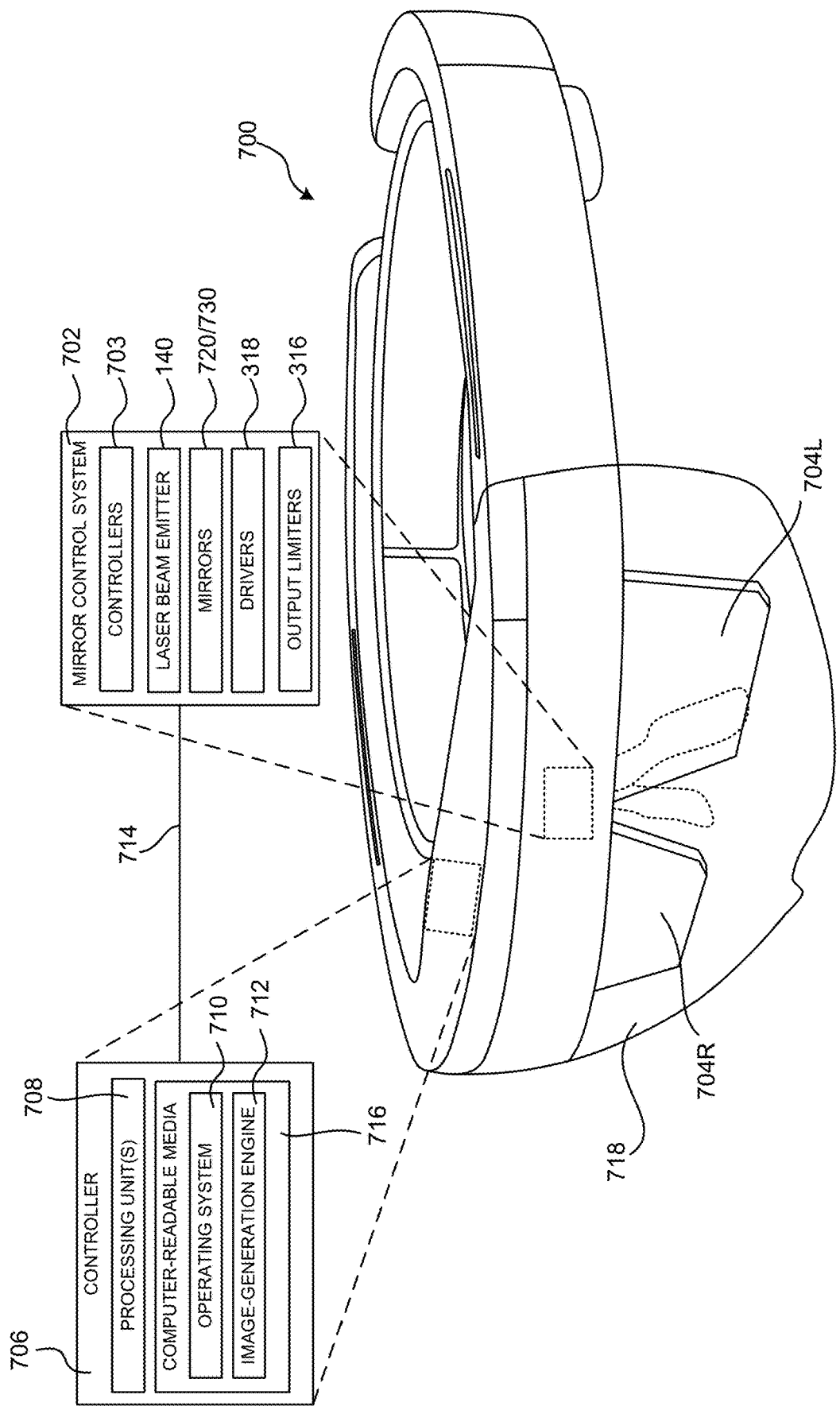
FIG. 7 shows the display device in the form of a head-mounted display device.

It can be appreciated that the techniques described herein may be deployed within a single-eye NED device 700 (e.g., GOOGLE GLASS) and/or a dual-eye NED device 700 (e.g., MICROSOFT HOLOLENS). The NED device 700 shown in FIG. 7 is an example device that is used to provide context and illustrate various features and aspects of the mirror control systems 702, and related components for crosstalk compensation as disclosed herein. Other devices and systems may also use the mirror control system 702 disclosed herein.

In some examples, the display panel 704 may be a waveguide display that includes one or more diffractive optical elements ("DOEs") for in-coupling incident light into a waveguide, expanding the incident light in one or more directions for exit pupil expansion, and/or out-coupling the incident light out of the waveguide (e.g., toward a user's eye). In some examples, the NED device 700 may further include an additional see-through optical component in the form of a transparent veil 718 positioned between the real-world environment (which real-world environment makes up no part of the claimed invention) and the display panel 704.

It can be appreciated that the transparent veil 718 may be included in the NED device 1400 for purely aesthetic and/or protective purposes. The NED device 700 may further include various other components, for example speakers, microphones, accelerometers, gyroscopes, magnetometers, temperature sensors, touch sensors, inertial measurement sensors, biometric sensors, other image sensors, energy-storage components (e.g., battery), a communication facility, a global positioning system ("GPS") receiver, etc.

In the illustrated example, a controller 706 is operatively coupled to the mirror control system 702. The controller 706 includes one or more logic devices and one or more computer memory devices storing instructions executable by the logic device(s) to deploy aspects of the functionality described herein with relation to the mirror control system 702. The controller 706 and the mirror control system 702 of the NED device 700 are operatively connected, for example, via a bus 714, which can include one or more of a system bus, a data bus, an address bus, a PCI bus, a Mini-PCI bus, and any variety of local, peripheral, and/or independent buses.

The controller 706 can also include one or more processing units 708. The processing unit(s) 708, can represent, for example, a CPU-type processing unit, a GPU-type processing unit, a field-programmable gate array ("FPGA"), a digital signal processor ("DSP"), or other hardware logic components that may, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

The controller 706 can also include one or more computer-readable media 716 storing an operating system 710 and data such as, for example, image data that defines one or more CG images for presentation by the NED device 700. The computer-readable media 716 may further include an image-generation engine 712 that generates output signals to control aspects of the operation of the mirror control system 702 to present the CG images.

As used herein, computer-readable media, such as computer-readable media 716, can store instructions executable by the processing units 708. The computer-readable media 716 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in the NED device 700, while in some examples one or more of a CPU, GPU, and/or accelerator are external to the NED device 700.

As used herein, the term computer-readable media can include computer storage media and/or communication media. Computer storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data.

Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device in a non-transitory fashion.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Figure 8:
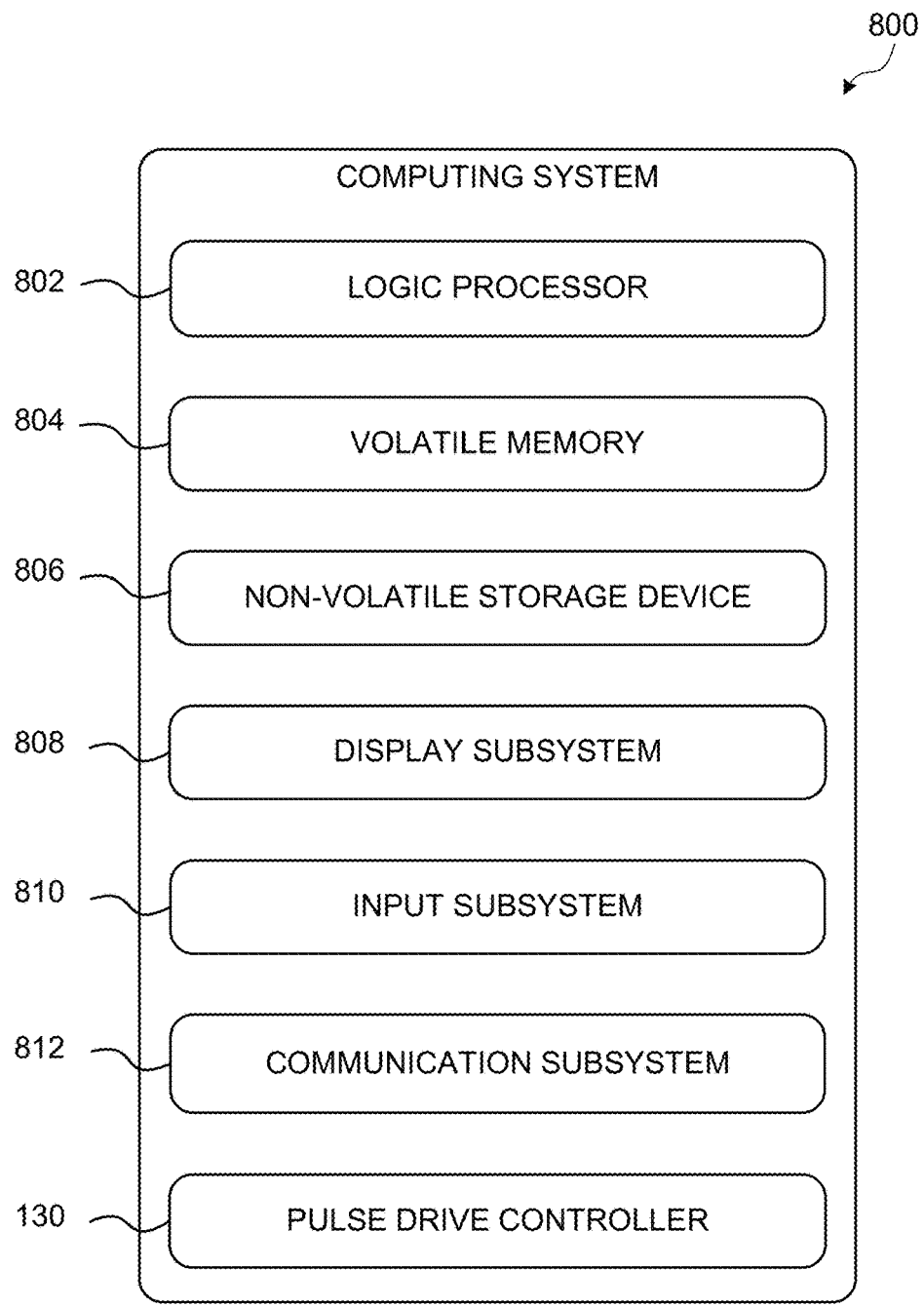
FIG. 8 shows an example computing environment in which the computer device may be enacted.

FIG. 8 shows an example computing environment in which aspects of the technologies disclosed herein can be implemented. In particular, FIG. 8 schematically shows a non-limiting embodiment of a computing system 800 that can be used to implement the technologies disclosed herein. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 800 includes a logic processor 802 volatile memory 904, and a non-volatile storage device 806. Computing system 800 may optionally include a display subsystem 808, input subsystem 810, communication subsystem 812, pulse drive controller 130 and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 802 may include one or more physical processors (e.g., hardware) configured to execute software instructions. Additionally, or alternatively, the logic processor 802 may include one or more hardware logic circuits or firmware devices configured to execute hardware-implemented logic or firmware instructions.

The logic processor 802 may be single-core or multi-core, and the instructions executed thereon may be configured for sequential, parallel, and/or distributed processing. Individual components of the logic processor 802 optionally may be distributed among two or more separate devices, which may be remotely located and/or configured for coordinated processing. Aspects of the operation of the logic processor 802 may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement aspects of the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is removed from the volatile memory 804. Aspects of logic processor 802, volatile memory 804, and non-volatile storage device 806 may be integrated together into one or more hardware-logic components, such as within an ASIC, SOC, or FPGA.

The terms "module," "program," and "engine" may be used to describe an aspect of computing system 800 typically implemented in software by a processor 802 to perform a particular function using portions of volatile memory 804, which function involves transformative processing that specially configures the processor 802 to perform the function. Thus, a module, program, or engine may be instantiated via logic processor 802 executing instructions held by non-volatile storage device 806, using portions of volatile memory 804.

It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface ("GUI"). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology, such as the display devices disclosed herein. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input ("NUI") componentry. Such componentry may be integrated or peripheral, and the transduction and/or processing of input actions may be handled on- or off-board.

Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 800 to send and/or receive messages to and/or from other devices via a network such as the Internet.

When included, the pulse drive controller 130 may be configured to operate as described previously herein to compensate for crosstalk related to the emitters.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The disclosure presented herein also encompasses the subject matter set forth in the following clauses:

Example Clause A: A method to control pulse drive signals for pulse drivers to compensate for crosstalk effects, the method comprising: receiving (501) a data stream ($DS_1$) associated with a first pulse driver (141); detecting (502) rising and falling edges in the received data stream ($DS_1$); capturing (503) timings ($TR_i$, $TF_i$) and amplitudes ($IR_i$, $IF_i$) of the detected rising and falling edges in a history buffer (131); determining (504) compensation factors ($CR[n]$, $CF[k]$) for the rising and falling edges of a second pulse driver (142) from a look-up table based on relative timing differences of a second data stream ($DS_2$) associated with the second pulse driver (142) and the historical timings ($TR_i[n]$ $TF_i[k]$) in the history buffer (131) for the rising and falling edges associated with the first pulse driver (141); and calculating (505) rising and falling compensation currents (ICR, ICF) for the second pulse driver (142) based on the determined compensation factors ($CR[n]$, $CF[k]$) and the historical amplitudes ($IR_i[n]$, $IF_i[k]$) in the history buffer (131).

Example Clause B: The method of clause A, further comprising adjusting (506) values in the second data stream ($DS_2$) to apply the calculated compensation currents (ICR, ICF) to the second driver signal of the second pulse driver (142).

Example Clause C: The method of any of the preceding clauses, wherein determining compensation factors comprises: identifying a reference time ($T_j$) associated with the second data stream ($DS_2$); calculating time differences ($LagR[n]$, $LagF[k]$) between the references time ($T_j$) and each rising and falling edge time in the history buffer (131) that is within a bracketed time window of the reference time ($T_j$); and accessing look-up tables with the calculated time differences ($LagR[n]$, $LagF[k]$) to identify the corresponding compensation factors ($CR[n]$, $CF[k]$).

Example Clause D: The method of clause C, wherein the bracketed time window is within a range of about 1 clock cycle to about 5 clock cycles relative to the drive signals, and wherein a depth N of the history buffer (131) is determined by the bracketed time window.

Example Clause E: The method of any of the preceding clauses, wherein capturing the timings ($TR_i$, $TF_i$) and amplitudes ($IR_i$, $IF_i$) of the detected rising and falling edges in the history buffer (131) further comprises updating the history buffer (131) to contain the most recent N captures.

Example Clause F: The method of any of the preceding clauses: wherein calculating (505) rising and falling compensation currents (ICR, ICF) for the second pulse driver (142) further comprises: calculating a rising compensation current as:

$$ICR = \sum_{0}^{n}(IR_i[n] * CR[n]);$$

and calculating a falling compensation current as:

$$ICF = \sum_{0}^{k}(IF_i[k] * CF[k]).$$

Example Clause G: A method to control pulse drive signals for pulse drivers to compensate for crosstalk effects, the method comprising: receiving (601) a first data stream (DS$_1$) associated with a first pulse driver (141); receiving (602) a second data stream (DS$_2$) associated with a second pulse driver (142); decomposing (603) the rising and falling edges from the first data stream (DS$_1$) into timing (TR$_i$, TF$_i$) and amplitude (IR$_i$, IF$_i$) values; storing (604) the decomposed timing (TR$_i$, TF$_i$) and amplitude (IR$_i$, IF$_i$) values in a history buffer (131); calculating (605) rise and fall time lags (LagR[n], LagF[k]) for each of the rising and falling edge timing values (TR$_i$[n], TF$_i$[k]) stored in the history buffer (131) relative to timing (T$_j$) of the second data stream (DS$_2$); and determining (606) compensation currents (ICR, ICF) for the rising and falling edges of the second pulse driver (142) based on: the calculated rise and fall time lags (LagR[n], LagF[k]), compensation factors associated (CR[n], CF[k]) with the calculated rise and fall time lags (LagR[n], LagF[k]), and amplitude values (IR[n], IF[k]) stored in the history buffer (131).

Example Clause H: The method of any of the preceding clauses, wherein receiving (601) the first data stream (DS$_1$) comprises: receiving a first current data stream (I$_i$) associated with drive currents of the first pulse driver (141); and receiving a first timing data stream (T$_i$) associated with the timing of drive currents of the first pulse driver (141).

Example Cause I: The method of any of the preceding clauses, wherein receiving (602) the second data stream comprises: receiving a second current data stream (I$_j$) associated with drive currents of the second pulse driver (142); and receiving a second timing data stream (T$_j$) associated with the timing of drive currents of the second pulsed driver (142).

Example Clause J: The method of any of the preceding clauses: wherein decomposing (603) the rising and falling edges from the first data stream into timing and amplitude values comprises: identifying one or more pulses in the first data stream (DS$_1$); identifying the timing and amplitude values for each rising edge of each identified pulse; and identifying the timing and amplitude values for each falling edge of each identified pulse.

Example Clause K: The method of any of the preceding clauses, wherein storing (604) the decomposed timing and amplitude values in the history buffer (131) comprises: storing timing and amplitude values for each rising edge of each identified pulse in a rising edge history buffer (BUF$_1$); and storing timing and amplitude values for each falling edge of each identified pulse in a falling edge history buffer (BUF$_2$).

Example Clause L: The method of any of the preceding clauses, wherein calculating (605) rise and fall time lags comprises: calculating a first reference time value for a rising edge of the second data stream; calculating a second reference time value for a falling edge of the second data stream; for each of the timing values in the rising edge history buffer, calculating a corresponding first difference with the first reference time; and for each of the timing values in the falling edge history buffer, calculating a corresponding second difference with the second reference time.

Example Clause M: The method of any of the preceding clauses, wherein determining compensation currents for the rising edges of the second pulsed driver comprises: retrieving each amplitude value (IR$_i$[n]) associated with each rising edge of the rising edge history buffer (131); identifying each first compensation factor (CR[n]) for each rising edge based on the corresponding first difference; and summing the multiplications of each amplitude value (IR$_i$[n]) by the corresponding first compensation factor (CR[n]) to yield a rising compensation current value (ICR):

$$ICR = \sum_{0}^{n}(IR_i[n] * CR[n]).$$

Example Clause N: The method of any of the preceding clauses, wherein determining compensation currents for the falling edges of the second pulsed driver comprises: retrieving each amplitude value (IF$_i$[k]) associated with each falling edge of the falling edge history buffer; identifying each second compensation factor (CF[k]) for each falling edge based on the corresponding second difference; and summing the multiplications of each amplitude value (IF$_i$[k]) by the corresponding second compensation factor (CF[k]) to yield a falling compensation current value (ICF):

$$ICF = \sum_{0}^{k}(IF_i[k] * CF[k]).$$

Example Clause O: The method of any of the preceding clauses, wherein: identifying the first compensation factor (CR[n]) for each rising edge corresponds to accessing a pre-calibrated lookup-table associated with rising edges; and identifying the second compensation factor (CR[k]) for each falling edge corresponds to accessing a pre-calibrated lookup-table associated with falling edges.

Example Clause P: The method of any of the preceding clauses, wherein the pre-calibrated lookup-table associated with rising edges is obtained by capturing luminosity values for a victim pulse while sweeping a rising edge associated with an aggressor pulse across a first range of values, and wherein the pre-calibrated lookup-table associated with falling edges is obtained by capturing luminosity values for a victim pulse while sweeping a falling edge associated with the aggressor pulse across a second range of values.

Example Clause Q: A device to adjust drive signals for pulse drivers to compensate for crosstalk effects, wherein the device is configured by machine executable instructions to: receive a data stream (DS$_1$) associated with a first pulse driver (141); detect rising and falling edges in the received data stream (DS$_1$); capture timings (TR$_i$, TF$_i$) and amplitudes (IR$_i$, IF$_i$) of the detected rising and falling edges in a history buffer (131); determine compensation factors (CR[n], CF[k]) for the rising and falling edges of a second pulse driver (142) from a look-up table based on relative timing differences of a second data stream (DS$_2$) associated with the second pulse driver (142) and the historical timings (TR$_i$[n] TF$_i$[k]) in the history buffer (131) for the rising and falling edges associated with the first pulse driver (141); and calculate rising and falling compensation currents (ICR, ICF) for the second pulse driver (142) based on the determined compensation factors (CR[n], CF[k]) and the historical amplitudes (IR$_i$[n] IF$_i$[k]) in the history buffer (131).

Example Clause R: The device of clause Q, wherein the device is further configured by machine executable instructions to: identify a reference time (T$_j$) associated with the second data stream (DS$_2$); calculate time differences (LagR[n], LagF[k]) between the references time (T$_j$) and each rising and falling edge time in the history buffer (131) that is within a bracketed time window of the reference time (T$_j$); and access look-up tables with the calculated time differences (LagR[n], LagF[k]) to identify the corresponding compensation factors (CR[n], CF[k]).

Example Clause S: The device of any of the preceding clauses, wherein the device is further configured by machine executable instructions to: adjust a depth N of the history buffer (131) based on a bracketed time window within a range of about 1 clock cycle to about 5 clock cycles relative to the drive signals; and update the history buffer (131) to contain the most recent N captures for the timings (TR$_i$, TF$_i$) and amplitudes (IR$_i$, IF$_i$) of the detected rising and falling edges in the history buffer (131).

Example Clause T: The device of any of the preceding clauses, wherein the device is further configured by machine executable instructions to calculate a rising compensation current (ICR) as:

$$ICR = \sum_{0}^{n}(IR_i[n] * CR[n])$$

and calculate a falling compensation current (ICF) as:

$$ICF = \sum_{0}^{k}(IF_i[k] * CF[k]).$$

It will be understood that the configurations and/or approaches described herein are examples, and that these specific embodiments or examples are not to be considered in a limiting sense, because numerous variations are possible. As such, various system, circuits, and/or devices may be broken into additional functions or circuits, and/or combined with other functions or circuits as may be desirable in a specific implementation. Similarly, the specific routines, procedures or methods described herein may represent one or more of any number of processing strategies. As such, various acts illustrated and/or described may be performed in the sequence illustrated and/or described, in other sequences, in parallel, or omitted. Likewise, the order of the above-described processes or methods may be changed. The subject matter thus includes all novel and non-obvious combinations and sub-combinations of the methods, processes, circuits, devices, systems and configurations, and other features, functions and/or properties disclosed herein, as well as any and all equivalents thereof.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method to control pulse drive signals for pulse drivers to compensate for crosstalk effects, the method comprising:
receiving a data stream associated with a first pulse driver;
detecting rising and falling edges in the received data stream;
capturing timings and amplitudes of the detected rising and falling edges in a history buffer;
determining compensation factors for the rising and falling edges of a second pulse driver from a look-up table based on relative timing differences of a second data stream associated with the second pulse driver and the historical timings in the history buffer for the rising and falling edges associated with the first pulse driver; and
calculating rising and falling compensation currents for the second pulse driver based on the determined compensation factors and the historical amplitudes in the history buffer.

2. The method of claim 1, further comprising: adjusting values in the second data stream to apply the calculated compensation currents to the second driver signal of the second pulse driver.

3. The method of claim 1, wherein determining compensation factors comprises:
identifying a reference time associated with the second data stream;
calculating time differences between the references time and each rising and falling edge time in the history buffer that is within a bracketed time window of the reference time; and
accessing look-up tables with the calculated time differences to identify the corresponding compensation factors.

4. The method of claim 3, wherein the bracketed time window is within a range of about 1 clock cycle to about 5 clock cycles relative to the drive signals, and wherein a depth N of the history buffer is determined by the bracketed time window.

5. The method of claim 4, wherein capturing the timings and amplitudes of the detected rising and falling edges in the history buffer further comprises updating the history buffer to contain the most recent N captures.

6. The method of claim 1, wherein calculating rising and falling compensation currents for the second pulse driver further comprises:
calculating a rising compensation current as $$ICR = \sum_{0}^{n}(IR_i[n] * CR[n]);$$

and
calculating a falling compensation current as:

$$ICF = \sum_{0}^{k}(IF_i[k] * CF[k]).$$

7. A method to control pulse drive signals for pulse drivers to compensate for crosstalk effects, the method comprising:
receiving a first data stream associated with a first pulse driver;
receiving a second data stream associated with a second pulse driver;
decomposing the rising and falling edges from the first data stream into timing and amplitude values;
storing the decomposed timing and amplitude values in a history buffer;
calculating rise and fall time lags for each of the rising and falling edge timing values stored in the history buffer relative to timing of the second data stream; and
determining compensation currents for the rising and falling edges of the second pulse driver based on: the calculated rise and fall time lags, compensation factors associated with the calculated rise and fall time lags, and amplitude values stored in the history buffer.

8. The method of claim 7, wherein receiving the first data stream comprises:
  receiving a first current data stream associated with drive currents of the first pulse driver; and
  receiving a first timing data stream associated with the timing of drive currents of the first pulse driver.

9. The method of claim 7, wherein receiving the second data stream comprises:
  receiving a second current data stream associated with drive currents of the second pulse driver; and
  receiving a second timing data stream associated with the timing of drive currents of the second pulsed driver.

10. The method of claim 7, wherein decomposing the rising and falling edges from the first data stream into timing and amplitude values comprises:
  identifying one or more pulses in the first data stream;
  identifying the timing and amplitude values for each rising edge of each identified pulse; and
  identifying the timing and amplitude values for each falling edge of each identified pulse.

11. The method of claim 10, wherein storing the decomposed timing and amplitude values in the history buffer comprises:
  storing timing and amplitude values for each rising edge of each identified pulse in a rising edge history buffer; and
  storing timing and amplitude values for each falling edge of each identified pulse in a falling edge history buffer.

12. The method of claim 7, wherein calculating rise and fall time lags comprises:
  calculating a first reference time value for a rising edge of the second data stream;
  calculating a second reference time value for a falling edge of the second data stream;
  for each of the timing values in the rising edge history buffer, calculating a corresponding first difference with the first reference time; and
  for each of the timing values in the falling edge history buffer, calculating a corresponding second difference with the second reference time.

13. The method of claim 12, wherein determining compensation currents for the rising edges of the second pulsed driver comprises:
  retrieving each amplitude value associated with each rising edge of the rising edge history buffer;
  identifying each first compensation factor for each rising edge based on the corresponding first difference; and
  summing the multiplications of each amplitude value by the corresponding first compensation factor to yield a rising compensation current value:

$$ICR = \sum_{0}^{n}(IR_i[n] * CR[n]).$$

14. The method of claim 13, wherein determining compensation currents for the falling edges of the second pulsed driver comprises:
  retrieving each amplitude value associated with each falling edge of the falling edge history buffer;
  identifying each second compensation factor for each falling edge based on the corresponding second difference; and
  summing the multiplications of each amplitude value by the corresponding second compensation factor to yield a falling compensation current value:

$$ICF = \sum_{0}^{k}(IF_i[k] * CF[k]).$$

15. The method of claim 14, wherein:
  identifying the first compensation factor for each rising edge corresponds to accessing a pre-calibrated lookup-table associated with rising edges; and
  identifying the second compensation factor for each falling edge corresponds to accessing a pre-calibrated lookup-table associated with falling edges.

16. The method of claim 15, wherein the pre-calibrated lookup-table associated with rising edges is obtained by capturing luminosity values for a victim pulse while sweeping a rising edge associated with an aggressor pulse across a first range of values, and wherein the pre-calibrated lookup-table associated with falling edges is obtained by capturing luminosity values for a victim pulse while sweeping a falling edge associated with the aggressor pulse across a second range of values.

17. A device to adjust drive signals for pulse drivers to compensate for crosstalk effects, wherein the device is configured by machine executable instructions to:
  receive a data stream associated with a first pulse driver;
  detect rising and falling edges in the received data stream;
  capture timings and amplitudes of the detected rising and falling edges in a history buffer;
  determine compensation factors for the rising and falling edges of a second pulse driver from a look-up table based on relative timing differences of a second data stream associated with the second pulse driver and the historical timings in the history buffer for the rising and falling edges associated with the first pulse driver; and
  calculate rising and falling compensation currents for the second pulse driver based on the determined compensation factors and the historical amplitudes in the history buffer.

18. The device of claim 17, wherein the device is further configured by machine executable instructions to:
  identify a reference time associated with the second data stream;
  calculate time differences between the references time and each rising and falling edge time in the history buffer that is within a bracketed time window of the reference time; and
  access look-up tables with the calculated time differences to identify the corresponding compensation factors.

19. The device of claim 17, wherein the device is further configured by machine executable instructions to:
  adjust a depth N of the history buffer based on a bracketed time window within a range of about 1 clock cycle to about 5 clock cycles relative to the drive signals; and
  update the history buffer to contain the most recent N captures for the timings and amplitudes of the detected rising and falling edges in the history buffer.

20. The device of claim 17, wherein the device is further configured by machine executable instructions to:
calculate a rising compensation current as:

$$ICR = \sum_{0}^{n}(IR_i[n] * CR[n]);$$

and
calculate a falling compensation current as:

$$ICF = \sum_{0}^{k}(IF_i[k] * CF[k]).$$

* * * * *